July 1, 1958     D. J. BLOOMBERG ET AL     2,840,987
IMPROVED METHOD AND ARRANGEMENT FOR STARTING
REACTION TYPE PROPULSION UNITS USING AN
AUXILIARY REACTION TYPE PROPULSION UNIT
Filed March 23, 1953
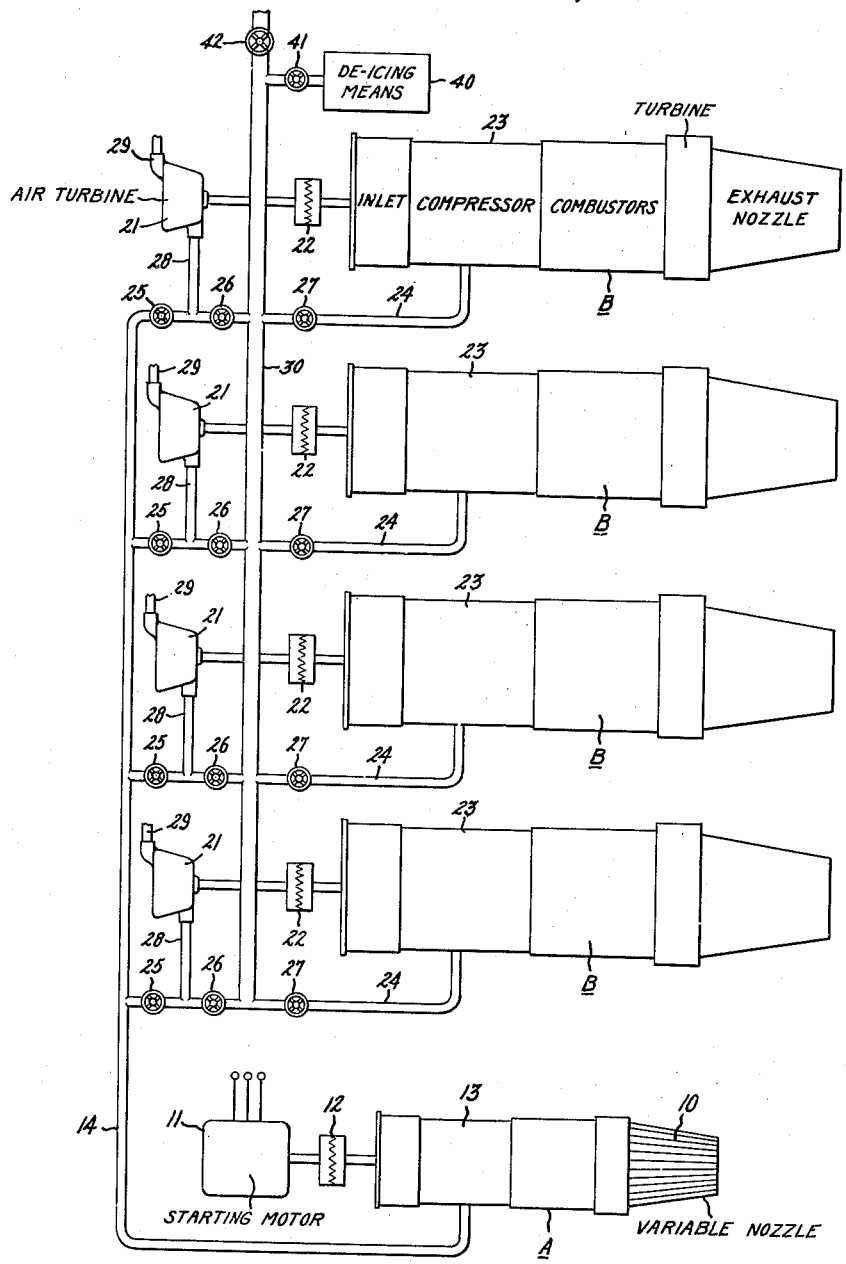
Inventors:
David J. Bloomberg,
Neil Burgess,
by Richard E. Hosley
Their Attorney.

United States Patent Office 2,840,987
Patented July 1, 1958

2,840,987

IMPROVED METHOD AND ARRANGEMENT FOR STARTING REACTION TYPE PROPULSION UNITS USING AN AUXILIARY REACTION TYPE PROPULSION UNIT

David J. Bloomberg, Newton, Mass., and Neil Burgess, Madeira, Ohio, assignors to General Electric Company, a corporation of New York Application March 23, 1953, Serial No. 344,166

5 Claims. (Cl. 60—39.14)

The present invention relates generally to jet propulsion apparatus and specifically to a means for and method of starting gas turbines used in reaction-type propulsion units.

The ever increasing size of jet propulsion apparatus, with rotatable parts of considerable mass, which require a large expenditure of energy to bring them to the minimum rotational speed necessary for the development of useful power, has raised the problem of the provision of adequate starting means, the size and weight of which are limited to a great extent by aircraft design. To less extent, a similar problem exists wherever the larger sizes of gas turbines are used, e. g., as in stationary power plants for secondary sources of power, if not as the principal sources.

Accordingly, it is an object of our invention to provide a new and improved means for and method of starting gas turbines used in jet propulsion apparatus.

It is another object of invention to provide a starter means which can be used as an auxiliary power unit with prime movers, once its starting function is completed.

Still another object of invention is to provide a starter means with low energy starting requirements for use with apparatus having high energy starting requirements, such as the larger gas turbines.

A further object of invention is to provide a novel apparatus and method by which jet propulsion apparatus can be brought up to the rotational speed necessary for delivery of useful power.

These and other objects of the invention will become more apparent from the following detailed description, read in conjunction with the accompanying drawing, in which the schematic figure shows a preferred embodiment of our invention, such as used presently in aircraft propulsion.

The objects of our invention may be realized through the provision of an auxiliary reaction-type unit to serve as a starter means for the main propulsion apparatus, and which can be used later to supplement the main apparatus, thus obviating the necessity of carrying individual starter means as dead weight.

In the embodiment shown in the figure of the drawing, there is disclosed the conventional structure used in jet propulsion apparatus, namely inlet, compressor, combustor, turbine and exhaust nozzle sections in series alignment, indicated specifically in the topmost unit of the drawing but duplicated also in the other units of the disclosed apparatus, with the auxiliary power unit or starter means shown at A, and the power units of the main propulsion apparatus or prime movers shown at B, the former indicated as having a variable exhaust nozzle at 10.

Operation of the auxiliary unit A is initiated by means, such as the starting motor, at 11, through a clutch mechanism at 12. In a similar manner, operation of the units of the main propulsion apparatus B is initiated by the air turbines indicated at 21 through clutch mechanisms 22. The compressor sections of units A and B, indicated at 13 and 23 respectively, are interconnected through a manifold 30 by means of bleeder conduits 14 and 24 and check valves 25, 26, and 27, with the starter air turbines 21 connected to the manifold 30 by means of conduits 28 and check valves 26, the turbine exhausts being shown at 29.

In operation, it is proposed to use an auxiliary power unit, such as A, with low energy starting requirements so that it can be started by a small electric motor 11, which is well within the design specification limits of size and weight, to start the units of the main propulsion apparatus or prime movers, and after the starting function has been completed, to use the auxiliary unit as thrust producing apparatus to augment the thrust of the prime movers. In this manner, the amount of dead weight which is carried when individual starter means are used, is reduced to that required for the auxiliary unit.

The auxiliary power unit A can be operated in accordance with the invention with either a fixed area nozzle or a variable area nozzle 10. Fixed nozzle area may be desirable in some instances and in such cases, the nozzle area is selected to obtain maximum allowable turbine inlet temperature when the maximum amount of compressor air is bled for starting or other purposes. When all valves 25 are closed (i. e., zero bleed), the auxiliary unit will operate as a normal jet propulsion gas turbine but with reduced turbine inlet temperature.

When a variable nozzle area is utilized at 10, auxiliary unit A is brought to full speed at maximum operating temperature and with nozzle area properly adjusted before bleeding of the compressor air is attempted. At this time, i. e., when bleeding is started, the jet nozzle area is increased in order to prevent excessive operating temperatures, while the compressor remains substantially at the same operating speed (except for minor fluctuations caused by the changes in turbine inlet and back pressures).

The pressurized air is led off by the bleeder conduit 14, and by proper manipulation of check valves 25, it becomes possible to start any of the units of main propulsion apparatus B individually, by supplying motive fluid to the proper starter air turbine 21 and engaging the proper clutch means 22. After one unit of the main propulsion apparatus B has been started by auxiliary unit A, it can be used to pressurize the manifold 30 through the respective bleeder conduit 24 and valve 27, and it becomes feasible to start the remaining units B together if necessary or individually through proper control of valves 26 and 27.

Once the starting function of auxiliary unit A has been completed, the variable nozzle 10 and check valves 25, 26, and 27 are brought to their normal closed relationship and the unit A can be used solely for thrust producing, along with the units of the main propulsion apparatus B.

Although the bleeder conduits 14 and 24 have been disclosed as leading from the compressor sections of units A and B, to those skilled in the art, it will be evident that either the combustor or turbine sections can be tapped to provide sources of pressurized motive fluid. Furthermore, it is not necessary that the bleeder conduits lead from corresponding sections, i. e., if the compressor section of auxiliary unit A is bled to provide the initial pressurized motive fluid for manifold 30, either the combustor or turbine sections of unit B may be tapped.

Depending upon conditions, it is possible to use the manifold 30 to provide pressurized fluid for other purposes, e. g., the deicing means at 40 or other means, the flows thereto being controlled by valves 41 and 42, respectively.

Auxiliary unit A is designed and operated initially to start the operation of the main propulsion apparatus and thereafter to augment the thrust of the main apparatus. Alternatively, a bleeder unit of special design and for special purposes could be used and could take the form of a gas turbine-compressor combination to supply the motivating fluid for starting, deicing or the operation of the various auxiliaries.

It will be evident that our invention provides a simple, economical and feasible means for and method of starting large gas turbines to overcome size and weight limitations imposed by aircraft design, even though the auxiliary power unit may have a greater specific fuel consumption.

Although many changes can be made in the disclosed apparatus without departing from the scope of the appended claims, it is intended that this disclosure shall be interpreted as illustrative and not limitative.

What we claim as new and desire to secure by Letters Patent of the United States is:

1. In a jet propulsion apparatus comprising a plurality of jet reaction-type units each having an individual starter air turbine, an auxiliary reaction-type propulsion unit adapted to initiate the operation of the remainder of said plurality of units and having a variable exhaust nozzle and with low energy starting characteristics, means for conveying pressurized fluid therefrom to said individual starter air turbines of said remainder of said plurality of units, and means for selectively controlling the flow of said fluid to said individual starter air turbines.

2. In combination, a plurality of power units each comprising inlet, compressor, combustor, turbine and exhaust nozzle sections respectively in series, one of said power units having low energy starting requirements and the remainder of said power units having considerably higher energy starting requirements, means for initiating the operation of each of said units, and means for delivering motive fluid from said unit having low energy starting requirements to said means for initiating the operation of the remainder of said units, comprising manifold means interconnecting said power units and being joined to said compressor sections.

3. In a combination as set forth in claim 2, means in said manifold means for selectively starting the remainder of said power units.

4. In a propulsion apparatus comprising a plurality of gas turbine units having in series inlet, compressor, combustor, turbine and exhaust nozzle sections and individual starter air turbines therefor, said units being connectable to said starter air turbines, an auxiliary gas turbine unit for supplying motive fluid for starting said plurality of units with low energy starting requirements and having a variable exhaust nozzle section, conduit means interconnecting sections of said units containing pressurized fluid and said starter air turbines of said plurality of units, and means located in said conduits for selective supply of motive fluid to the last-mentioned starter means.

5. In a method for initiating the operation of a power unit having high energy starting requirements, the steps comprising starting an auxiliary reaction-type propulsion unit having low energy starting requirements, increasing the area of the exhaust nozzle of said unit as pressurized fluid is removed therefrom, and providing said pressurized fluid to turbine means for starting said power unit.

References Cited in the file of this patent

UNITED STATES PATENTS

| | | |
|---|---|---|
| 1,609,284 | Barbarou | Dec. 7, 1926 |
| 2,318,905 | Traupel | May 11, 1943 |
| 2,409,177 | Allen et al. | Oct. 15, 1946 |
| 2,531,761 | Zucrow | Nov. 28, 1950 |
| 2,551,229 | Alford et al. | May 1, 1951 |
| 2,577,919 | Roy | Dec. 11, 1951 |
| 2,580,591 | Pouit | Jan. 1, 1952 |
| 2,608,054 | Price | Aug. 26, 1952 |
| 2,618,431 | Walker | Nov. 18, 1952 |
| 2,618,470 | Brown et al. | Nov. 18, 1952 |
| 2,650,666 | Dorand et al. | Sept. 1, 1953 |

FOREIGN PATENTS

| | | |
|---|---|---|
| 366,773 | Great Britain | Feb. 11, 1932 |